March 7, 1939. W. B. ANDERSON ET AL 2,149,933

FLEXIBLE ICE TRAY GRID

Filed April 24, 1936

WITNESSES:

INVENTORS
WILLIAM B. ANDERSON
AND JULES N. SALER.
BY
ATTORNEY

Patented Mar. 7, 1939

2,149,933

UNITED STATES PATENT OFFICE 2,149,933

FLEXIBLE ICE TRAY GRID

William B. Anderson, West Springfield, and Jules N. Saler, Springfield, Mass., assignors to Westinghouse Electric & Manufacturing Company, East Pittsburgh, Pa., a corporation of Pennsylvania Application April 24, 1936, Serial No. 76,232

8 Claims. (Cl. 62—108.5)

Our invention relates to liquid congealing apparatus and particularly to liquid congealing apparatus for forming ice cubes suitable for domestic use.

It is an object of our invention to provide a metal pan and grid structure through which heat from the liquid to be frozen is quickly abstracted and from which the frozen liquid is easily removable without the application of heat.

It is another object of our invention to provide a novel flexible grid structure from which the amount of frozen liquid removed is determined by the user.

It is another object of our invention to provide improved liquid congealing apparatus in which the means for separating the grid member with frozen liquid therein from the pan member is also effective to flex the grid member a sufficient distance to remove the desired number of ice cubes therefrom.

These and other objects are effected by our invention as will be apparent from the following description and claims taken in connection with the accompanying drawing, forming a part of this application, in which:

Figure 1:
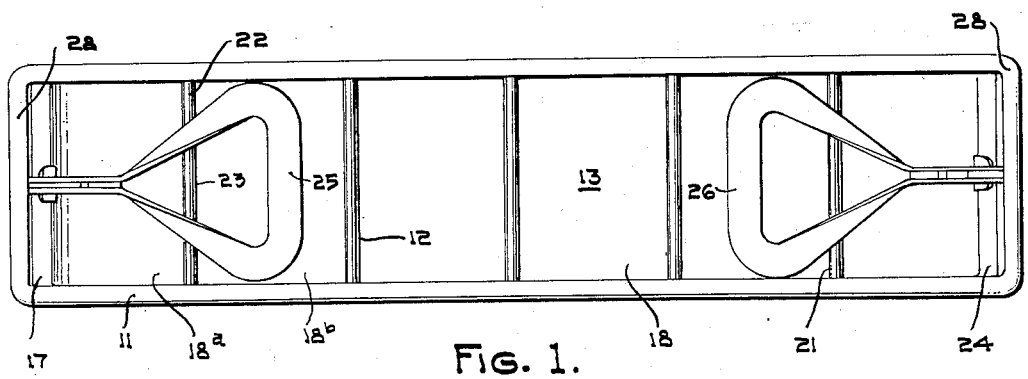
Fig. 1 is a top plan view of an ice pan and removable grid structure constructed in accordance with our invention.
Figure 2:
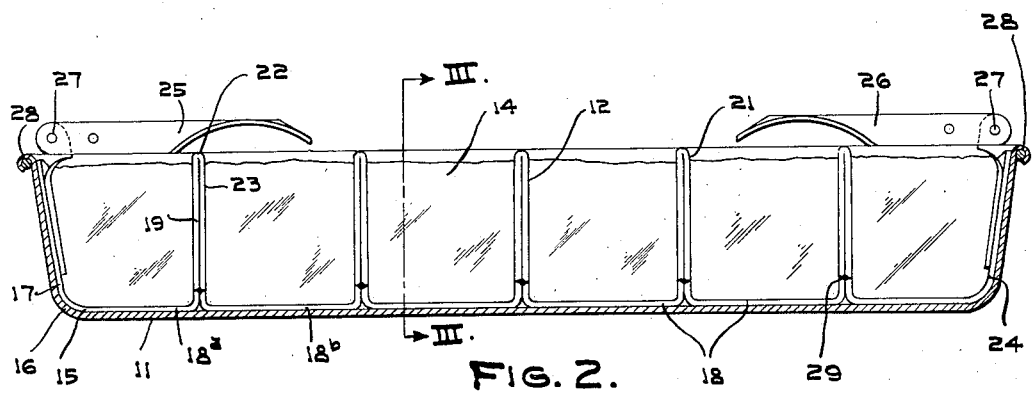
Fig. 2 is a side elevational view of the liquid congealing apparatus shown in Fig. 1 with portions of the pan member broken away to more clearly show the construction of the grid member; and, Fig. 3 is a sectional view of the liquid congealing apparatus taken on line III—III of Fig. 2.
Figure 3:
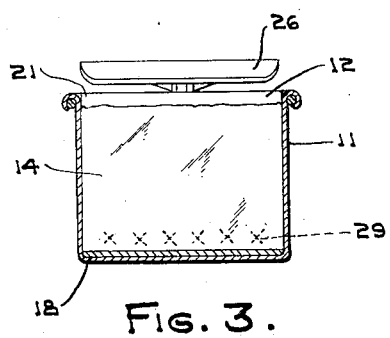

Referring specifically to the drawing for a detailed description of our invention, numeral 11 designates a pan member, which is preferably formed of stamped aluminum and is substantially rigid. A removable grid member 12 is disposed within the pan member 11 for dividing same into a plurality of cells 13 for forming ice cubes 14, as shown in Figs. 2 and 3. The grid member 12 is preferably formed of flexible metal such as, for example, relatively thin gauge stainless steel strip material.

The grid member 12 is preferably formed of a single strip 15 of the aforesaid flexible metal and is bent and folded in the following manner to provide a flexible grid structure embodying our invention. The strip is folded at an angle conforming with a corner 16 of the pan member 11 and forms an end wall 17 and the first section 18a of a bottom wall generally indicated at 18. The strip 15 is then bent at right angles to the bottom wall section 18a and is extended upwardly to near the top of the pan member 11, forming one side 19 of a transverse vertically extending wall 21 which extends completely across the pan member 11. The sheet 15 is then bent over at 22 and extends downwardly to form the other side 23 of the transverse wall 21 in contact with the first side 19. The sheet 15 is then bent again at right angles to form the next section 18b of the bottom wall 18. It will be seen that the above described construction is continued to form the desired number of bottom wall members and transverse vertically extending wall members, and that the opposite end of the grid 12 is bent to form an end wall 24. It will also be obvious that the sections of the bottom wall and the end walls 17 and 24 lie flat against the pan member and that the transverse walls 21 are formed of a doubled sheet of the strip material 15 closed at the top by the fold 22 and open on the other three sides.

Handles 25 and 26 are attached to the end walls 17 and 24, respectively, by a pivotal connection 27 and are adapted to be rotated outwardly to contact edges 28 of the pan member 11, said edges therefore providing a fulcrum and the handles providing levers for breaking the bond between the ice cubes 14 and the pan member 11, to lift the grid 12 with the ice cubes thereon from the pan member 11. After the grid member and the ice cubes are removed from the tray, the handle means are utilized to impart flexing movement to the grid structure 12 to remove the ice cubes therefrom. The use of similar handle means on a flexible grid for removing the grid from a pan and for imparting flexing movement to the grid to remove ice cubes therefrom is fully described and claimed in Patent No. 2,037,518, issued April 14, 1936 for Liquid congealing apparatus by Jules N. Saler and assigned to the assignee of the present application.

In order to prevent flexing of the grid member 12 upwardly of the pan member when force is applied at the ends thereof by the handles 25 and 26 to remove the grid member from the pan member, stiffening means is provided which consists of welds 29 which fasten together the two sides 19 and 23 of each transverse wall 21, adjacent the bottom of the walls 21. When ice cubes 14 are present in the cells 13, the grid member 12 will not flex upwardly because the sides 19 and 23 will not spread at the bottom of the walls 21 due to the presence of the welds 29 and the tops of the walls 21 will not be brought closer together by flexing the sections of the bottom wall 18 because of the presence of the ice cubes 14.

The stiffening means, however, does not prevent flexing of the grid member 12 in other directions.

After the grid member 12 is removed from the pan 11 with the ice cubes 14, the grid member may be progressively flexed by holding one end of the grid member rigid and applying downward force to the other end thereof. The ice cubes 14 will therefore be progressively loosened from the cells 13 as more force is applied, so that any desired number of ice cubes may be removed. The ice cubes remaining in the grid member may obviously be replaced in the pan member and the emptied cells 13 again filled with liquid to be frozen. Whether or not all the ice cubes are removed from the pan member, the liquid placed therein will be quickly frozen because heat is transferred rapidly through the metallic pan and grid members.

From the foregoing, it will be clear that we have provided an inexpensive pan and grid structure for quickly congealing liquids, and have furthermore provided for ready removal of the desired number of ice cubes from the liquid congealing apparatus without the use of heat.

While we have shown our invention in but one form, it will be obvious to those skilled in the art that it is not so limited, but is susceptible of various changes and modifications without departing from the spirit thereof, and we desire, therefore, that only such limitations shall be placed thereupon as are imposed by the prior art or as are specifically set forth in the appended claims.

What we claim is:

1. A grid for dividing a substantially rigid metal pan member into a plurality of ice containing cells, said grid being formed of flexible sheet metal and embodying a flexible bottom wall member formed of a single thickness of said sheet metal and a plurality of transverse wall members extending vertically from the bottom wall member and being formed of a double thickness of said sheet metal and means cooperating with the ice in said cells for preventing upward flexing of said grid when force is applied to an end thereof in an upward direction, said grid being flexible in other directions.

2. A flexible grid for dividing a substantially rigid metal pan member into a plurality of ice containing cells, said grid being formed of flexible sheet metal and embodying a bottom wall member formed of a single thickness of said sheet metal and a plurality of transverse wall members extending vertically from the bottom wall member and being formed of a double thickness of said sheet metal, and means cooperating with the ice in said cells for preventing upward flexing of said grid when force is applied in an upward direction to an end of the grid comprising means for securing the lower portions of the two sheets of each of said transverse walls together, said grid being flexible in other directions.

3. A grid for dividing a pan member into a plurality of ice containing cells, said grid being formed of flexible sheet metal and embodying a flexible bottom wall member formed of a single thickness of said sheet metal and a plurality of transverse wall members extending vertically from the bottom wall member and being formed of a double thickness of said sheet metal, handle means disposed adjacent each end of the grid structure to remove the grid with ice therein from said pan member, said handle means being removable from the pan member with said grid member for flexing the grid after removal from the pan member to remove ice therefrom, and means for imparting rigidity to the grid when ice is present therein so that when force is applied to the ends of the grid in an upward direction by said handle means the grid is lifted a uniform distance from the pan member, said last-mentioned means being ineffective to prevent flexing of the wall member in other directions when ice is present therein.

4. A grid for dividing a substantially rigid metal pan member into a plurality of ice containing cells, said grid member being formed of a single flexible sheet of metal bent to form a horizontal wall section, a transverse wall section comprising said sheet bent at right angles to said horizontal wall section, doubled at the top and extending downwardly to the plane of the bottom wall section in contact with the other portion of the sheet forming the transverse wall section, another horizontal wall section formed of said sheet bent at right angles to said transverse wall section, said horizontal wall sections lying flat in said pan member in contact with the bottom thereof, said transverse wall section being disposed vertically and extending the entire width of said pan member, and means for fastening the bottoms of the two sheets of the transverse wall section together.

5. A grid for dividing a substantially rigid metal pan member into a plurality of ice containing cells, said grid member being formed of a single flexible sheet of metal bent to form a first horizontal wall section, a first transverse wall section comprising said sheet bent at right angles to said horizontal wall section, doubled at the top and extending downwardly to the plane of the bottom wall section in contact with the other portion of the sheet forming the transverse wall section, a second horizontal wall section formed of said sheet bent at right angles to said first transverse wall section, said horizontal wall sections lying flat in said pan member in contact with the bottom thereof, and a second transverse wall section formed in the same manner as the first transverse wall section, said transverse wall sections being disposed vertically and extending across said pan member, means for fastening the bottoms of the two sheets of each of the transverse wall sections together, and handle means associated with an end of the grid structure for forcibly removing the grid structure and ice from the pan member and for flexing the grid structure after removal from the pan member to release the ice therefrom.

6. In liquid congealing apparatus, the combination of a pan member embodying a flat lower surface, a removable grid for dividing the pan member into a plurality of ice containing cells, said grid being formed of flexible sheet metal and embodying a bottom wall member formed of a single thickness of said sheet metal engaging with substantially the entire lower surface of said pan member, a plurality of transverse wall members extending vertically from the bottom wall member and being formed of a double thickness of said sheet metal and handle means disposed adjacent each end of the grid to remove the grid with ice therein from said pan member, said handle means being removable from the pan member with said grid for flexing the grid after removal from the pan member.

7. In liquid congealing apparatus, the combination of a substantially rigid metal pan member embodying a flat lower surface, a removable flexible grid for dividing the pan member into a plurality of ice containing cells, said grid being formed of sheet metal and embodying a flexible bottom wall member engaging with substantially the entire lower surface of the pan member and a plurality of transverse wall members extending vertically from the bottom wall member and substantially in alinement with the transverse axis of the pan member, said grid being progressively flexible, when removed from said pan member, in a direction tending to separate respective transverse wall members, whereby the quantity of ice removed from the grid by flexing may be controlled by the amount of the flexing.

8. The combination claimed in claim 7 wherein handle means are attached to the ends of the grid to raise the grid from the pan member and to thereafter impart said flexing movement to the grid.

WILLIAM B. ANDERSON.
JULES N. SALER.